United States Patent [19]

Gardenier et al.

[11] Patent Number: 5,433,775
[45] Date of Patent: Jul. 18, 1995

[54] ADHESIVE STICK BASED ON STARCH ETHERS

[75] Inventors: Karl-Josef Gardenier, Duesseldorf; Gerhard Gierenz, Solingen; Wolfgang Klauck, Meerbusch; Bernd Peters, Solingen; Horst Donothek, Monheim; Norbert Doering, Neuss, all of Germany

[73] Assignee: Henkel Kommanditgesellschaft auf Aktien, Duesseldorf, Germany

[21] Appl. No.: 182,113

[22] PCT Filed: Jul. 21, 1992

[86] PCT No.: PCT/EP92/01665

§ 371 Date: Feb. 28, 1994

§ 102(e) Date: Feb. 28, 1994

[87] PCT Pub. No.: WO93/03109

PCT Pub. Date: Feb. 18, 1993

[30] Foreign Application Priority Data

Jul. 30, 1991 [DE] Germany .......... 41 25 122.9

[51] Int. Cl.⁶ .......... C09J 103/08
[52] U.S. Cl. .......... 106/211
[58] Field of Search .......... 106/211

[56] References Cited

U.S. PATENT DOCUMENTS

| | | | |
|---|---|---|---|
| Re. 30,747 | 9/1981 | Muszik et al. | 106/178 |
| 4,746,696 | 5/1988 | Gierenz et al. | 524/98 |

FOREIGN PATENT DOCUMENTS

| | | |
|---|---|---|
| 2338980 | 8/1977 | France . |
| 1811466 | 8/1969 | Germany . |
| 2054503 | 5/1972 | Germany . |
| 2204482 | 8/1972 | Germany . |
| 2219697 | 11/1972 | Germany . |
| 2419067 | 11/1974 | Germany . |
| 2620721 | 3/1977 | Germany . |
| 2053674 | 9/1978 | Germany . |
| 2613935 | 11/1980 | Germany . |
| 3015268 | 10/1981 | Germany . |
| 3328099 | 2/1985 | Germany . |
| 3606382 | 9/1987 | Germany . |
| 3702871 | 8/1988 | Germany . |
| 3921554 | 1/1991 | Germany . |
| 4161475 | 6/1992 | Japan . |
| 1207387 | 9/1970 | United Kingdom . |

OTHER PUBLICATIONS

Ullmann, Encyklopaedie der techn. Chemie 4., Verlag Chemie, Weinheim/Gergsh. (1974), Band 22, Unterkap 6.2 bis 6.4.

Primary Examiner—David Brunsman
Attorney, Agent, or Firm—Wayne c. Jaeschke; John Daniel Wood; Daniel S. Ortiz

[57] ABSTRACT

The invention relates to a dimensionally stable, soft-rubbing adhesive stick consisting of a water-based preparation of starch derivatives and a soap gel as the shaping gel-forming component and, optionally, other auxiliaries. To obtain an adhesive stick which is largely based on natural raw materials and which may therefore be regarded as safe from ecological and toxicological standpoints, the invention is characterized in that viscosity-reduced starch ethers are present as the starch derivatives.

24 Claims, No Drawings

ADHESIVE STICK BASED ON STARCH ETHERS

This application is a 371 of PCT/EP92/01665, filed Jul. 21, 1992.

BACKGROUND OF THE INVENTION

1. Field of the Invention

An adhesive stick based on starch ethers

This invention relates to an adhesive stick consisting of a water-based preparation of starch derivatives and a soap gel as the shaping gel-forming component and, optionally, other auxiliaries. The invention also relates to a process for the production of such sticks and to their use.

2. Discussion of Related Art

Adhesive sticks (=stick-like adhesives which are displaceably mounted in a closeable tube which leave behind a tacky film when rubbed onto a receiving surface) are now part of everyday life. They contain in particular (see DE-PS 18 11 466) water-soluble or water-dispersible synthetic high polymers of adhesive character, more particularly polyvinyl pyrrolidone (PVP), dissolved in an aqueous/organic liquid phase together with a shaping gel-forming component. The gel-forming component is selected in particular from alkali metal or ammonium salts of aliphatic carboxylic acids, more particularly containing from about 12 to 22 carbon atoms. If the basically high-tack water-based preparations of the polymer substances of adhesive character are heated together with small quantities of the gel-forming component based on fatty acid soaps to relatively high temperatures, more particularly above 50° C., and if this solution is subsequently left standing to cool, the mixture solidifies to a more or less stiff soap gel in which the shaping and comparatively rigid micelle structure of the soap gels is predominantly in evidence at first. This provides for the known production and handling of such adhesives in stick form in closeable tubes. When the stick is rubbed onto a receiving surface, the micelle structure if destroyed so that the rigid mixture is converted into a paste-like state in which its adhesive character is predominant.

Numerous attempts have been made to modify adhesive sticks of this type by changing the shaping gel-forming component and/or by changing the solvent-activated adhesive-forming component. DE-OS 22 04 482 uses the reaction product of sorbitol and benzaldehyde as the shaping gel-forming component. According to DE-OS 26 20 721, salts of substituted terephthalic acid amides are said to be used as the gelling agent. According to DE-OS 20 54 503, free long-chain aliphatic acids or esters thereof are said to form the gel-forming component instead of the alkali metal salts of aliphatic carboxylic acids. DE-OS 22 19 697 seeks to improve adhesive sticks of the type in question by incorporation of anionic non-soap-like wetting agents in the stick, particularly with a view to improving its rubbing onto the substrate. According to DE-OS 24 19 067, a reaction product of aromatic diisocyanates with mono-alkanolamines and/or dialkanolamines is said to be used as the gel-forming agent.

Despite all these proposals, the oldest form of adhesive sticks of the type in question based on soap gels, which are described in DE-PS 18 11 466 cited at the beginning, are still in use to by far the predominant extent to this day. A solution of PVP in an aqueous organic solvent mixture is converted into the form of the soft-rubbing adhesive stick by incorporation of alkali metal soaps of aliphatic carboxylic acids.

Gelman patent application DE 36 06 382 describes an improved adhesive stick which, to improve its soft-rubbing characteristics, additionally contains a limited quantity of lactams of lower aminocarboxylic acids and/or the corresponding ring-opened aminocarboxylic acids.

Other patents and patent applications relating to adhesive sticks include DE 39 21 554, DE 37 02 871, DE 33 28 099, DE 26 13 935, DE 30 15 268 and DE 20 53 674. According to the last of these documents, film-forming, natural and synthetic polymers are used as the adhesive component. Among a number of compounds, carboxymethyl starch is mentioned as an Example of starch derivatives. Water-soluble or water-dispersible adhesives such as, for example, ethoxylated and propoxylated starch derivatives are known from DE 18 11 466 as a constituent of adhesive sticks. If compounds such as these are used in their commercial form as the predominant or sole adhesive component of adhesive sticks, the adhesive stick may be useable in principle, but is not satisfactory in regard to dimensional stability, soft rubbing and minimum tackiness because it is generally friable in its constitution, is difficult to apply and lacks sufficient tack.

The problem addressed by the present invention was to remedy these deficiencies and to provide an adhesive stick which would be dimensionally stable and easy to rub onto substrates and which would show sufficient adhesive power although it was to be formulated without solvents on the basis of ecologically safe raw materials of native origin. However, the necessary changes would not make it any more difficult to produce, but on the contrary would facilitate its production.

SUMMARY OF THE INVENTION

It has surprisingly been found that an adhesive stick of the type in question can be obtained if starch ethers degraded to a defined extent are used in a certain viscosity range as the adhesive component.

Accordingly, the problem addressed by the present invention is solved by an adhesive stick consisting of a water-based preparation of macromolecular substrates as the adhesive component and a soap gel as the shaping gel-forming component and, optionally, other auxiliaries, characterized in that the adhesive component contains viscosity-reduced starch ethers.

DETAILED DESCRIPTION OF THE INVENTION

"Viscosity-reduced" starch ethers are understood to be starch ethers which not only have been etherified in largely polymer-analog form, but in addition have been chemically or physically destructured so that their viscosity is below about 2,000,000 mPas (30% solution, 20° C., Brookfield).

According to Ullmann, Encyklopädie der technischen Chemie, 4th Edition, Verlag Chemie, Weinheim/Bergstrasse (1974), starch ethers are formally products of the condensation between the hydroxy groups of the anhydroglucose units (AGU) of starch molecules and alcoholic hydroxy groups of other compounds. Only a few water-soluble starch ethers of this type are produced on a relatively large scale and industrially used. They include certain hydroxyalkyl starches, more particularly hydroxyethyl and hydroxypropyl starch and also carboxymethyl starch. Reaction products of native starches with ethylene oxide, propylene oxide, butylene oxide and/or glycidols have proved to be particularly suitable for the purposes of the invention. More particularly, starch derivatives having relatively high degrees of substitution, preferably nonionic starch ethers, can advantageously be adjusted to a relatively low viscosity level by mechanical treatment in aqueous systems which promotes the degradation of crystalline structures and/or oxidative, acid-hydrolytic, enzymatic and thermal degradation and are therefore particularly suitable. Accordingly, viscosity-reduced nonionic starch ethers, particularly hydroxyalkyl starch, are particularly preferred because the desired adhesive sticks are best obtained with them. The degree of substitution (DS) should preferably be 0.1 to 2.0 and, more preferably, 0.2 to 1.0. Mixed etherification products may of course also be successfully used in accordance with the invention. The adhesive sticks according to the invention preferably contain 5% by weight to 50% by weight viscosity-reduced starch ethers. These percentages by weight are based on the total weight of the stick.

In addition to the viscosity-reduced starch ethers according to the invention, the adhesive stick may contain other macromolecular substances (for example polyurethane dispersions, polyvinyl pyrrolidone and/or polyacrylates) as the adhesive component. The total percentage content of the adhesive components should be 15 to 50% by weight.

In principle, any native starches may be used for the production of the starch derivatives used in accordance with the invention. Suitable starches can be found in Ullmann, loc. cit., Vol. 22, sub-chapters 6.2 to 6.4 to the chapter entitled "Starke (Starch)". In addition to cereal starches, such as cornstarch, wheat starch or rice starch, and also tuber or root starches, such as potato or tapioca starch, pulse starches, such as pea starch or bean starch, are also suitable.

The adhesive sticks according to the invention best contain sodium salts of $C_{12-22}$ fatty acids of natural or synthetic origin as the soaps for forming the gel structure. $C_{14-18}$ fatty acids and mixtures thereof are preferred. The sodium salts of the fatty acids, i.e. the soaps, are present in quantities of 3 to 20% by weight, based on the weight of the adhesive stick, and preferably in quantities of 5 to 10% by weight.

The auxiliaries typically used in adhesive sticks may also be used in the adhesive sticks according to the invention in quantities of 0 to 25% by weight, based on the adhesive stick. The auxiliaries in question are, for example, plasticizers and/or moisture regulators, i.e. organic water-soluble solvents, which are normally used in adhesive sticks. Other suitable auxiliaries are polyfunctional alcohols, such as propylene glycol, glycerol, polyglycerols, trimethylol propane, polyether glycols and also sorbitol and/or low molecular weight starch hydrolyzates which have been converted into the corresponding polyols by reduction with hydrogen. For example a mixture of glycerol and polyethylene glycol may be used. The non-volatile organic solvents mentioned should be used in quantities of at most up to 50% by weight, based on the water content of the sticks.

In addition to the main components mentioned, typical auxiliaries, for example substances which promote easy and soft rubbing, may also be used. Substances such as these are, for example, aminocarboxylic acids and/or their lactams. Suitable aminocarboxylic acids or lactams should contain up to 12 carbon atoms and, more particularly, from 4 to 8 carbon atoms. The preferred representative in terms of practical application is ε-caprolactam or the 7-aminocaproic acid derived therefrom. The quantity in which the lactams or corresponding aminocarboxylic acids are used is normally no more than 15% by weight and, for example, between 1% by weight and 10% by weight, based on the stick as a whole.

The adhesive sticks according to the invention may contain pigments, dyes, fragrances, preservatives and the like as further auxiliaries. These auxiliaries are present in the usual small quantities. Other possible additives are, for example fillers, optical brighteners, dextrins, cellulose derivatives and non-destructured starch derivatives. Mannans, more particularly galactomannans, may be present as further additives in the adhesive sticks according to the invention. Galactomannans from the fruit of the carob tree and from guar flour are particularly suitable. The destructured ethers may also be replaced to a small extent by destructured mannans.

The individual components are preferably present in the adhesive stick in the following quantities: 3 to 10% by weight soaps, 5 to 40% by weight viscosity-reduced starch ethers and 0 to 25% by weight auxiliaries, of which 0 to 20% by weight may be water-soluble or water-dispersible polymers. The balance to 100% is water.

The mixture is processed in known manner from the mixtures of the water-based preparations of viscosity-reduced starch ethers, the soap component and the other auxiliaries, if any, heated to temperatures of at least 50° C. and preferably to temperatures of 80° C. These mixtures, which are readily pourable at temperatures in the range mentioned, are preferably introduced directly into stick tubes or similar containers and allowed to solidify to the desired gels in the absence of any mechanical action. The water-based preparations of the viscosity-reduced starch ethers are preferably prepared by mixing the starch ethers with water and—substantially irreversibly—degrading the superstructures of the starch ethers by mechanical action and/or by oxidative, acid-catalytic, enzymatic or thermal degradation of the starch ethers. Concentrated systems having a starch ether content of from about 20% by weight to 70% by weight are preferred because it has been found that the preparations are easiest to handle in these concentration ranges. The water-based preparations may then be combined with the other components in the described manner. If desired, the starch derivative preparations may be diluted before mixing with the other components, preferably to a starch ether content of 20% by weight to 40% by weight.

The aqueous systems may be mechanically destructured in machines known to the expert, preferably at the high concentrations mentioned. Suitable destructuring machines are headers, extruders, stator-rotor machines and/or stirrers. The degree to which the superstructures of the aqueous starch derivative systems are mechanically degraded is dependent on concentration, temperature, residence time and shearing. The degree of degradation of the starch superstructures should advantageously lie close to the limit. The degree of degradation can be determined by measurement of the solution viscosities. The starch superstructures can also be degraded without any disadvantages during the production of the adhesive sticks in mixing machines in which a sufficient degree of degradation of the starch superstructures can be achieved. In the context of the invention, the degree of degradation can be assumed to be sufficient when a 30% by weight aqueous solution of the starch ether used has a Brookfield viscosity at 20° C. in the range from about 100 to 1,000,000 mPas, preferably in the range from 2,000 to 100,000 mPas and, more preferably, in the range from 3,000 to 30,000 mPas. Adhesive sticks containing 5% by weight to 10% by weight of the starch ethers according to the invention with a viscosity of 1,000,000 to 50,000 mPas or 10 to 30% by weight with a viscosity of 100,000 to 2,000 mPas or 30 to 50% by weight with a viscosity of 30,000 to 100 mPas have proved to be particularly suitable. In addition, other polymers may be added as the adhesive component in a total quantity of up to 50% by weight. The percentages by weight are based on the total weight of the adhesive stick.

The mechanical degradation of the starch or starch ether superstructures can be supported or replaced by chemical degradation of the starch molecules to the viscosity level according to the invention. The partial chemical degradation of the starch or starch ether molecules may be carried out both before and after mechanical degradation of the starch superstructures. The two processes may also be carried out alone independently of one another. The viscosity reduction of the starch ether solution may also be carried out solely by chemical degradation to the viscosity level according to the invention. The starch molecules may be degraded by the oxidative, acid-hydrolytic, enzymatic or thermal methods of degradation known to the expert.

The processes normally used for degrading starches are described in detail in "Ullmanns Encyklopädie der technischen Chemie" 4th Edition, Verlag Chemie, Weinheim (1974). Preferred oxidizing agents for oxidative degradation are chromic acid, permanganate, hydrogen peroxide, nitrogen dioxide, hypochlorite, periodate and peracids such as, for ,example, peracetic acid. Preferred acids for acidhydrolyric degradation are hydrochloric acid, sulfuric acid and phosphoric acid, although other acids, such as for example acetic acid, oxalic acid, sulfurous acid, perchloric or trichloroacetic acid, may also be used. Alpha- and beta-amylases and also the glucoamylases and debranching enzymes may be used as starch-degrading enzymes.

The adhesive sticks according to the invention show high adhesive power and, in addition to the surface-to-surface bonding of substrates, may be used in particular for the bonding of paper and/or cardboard. In addition, they may also be produced, if desired, without using water-soluble plasticizers (water-soluble organic solvents) or moisturizers regulators (again water-soluble organic solvents).

The adhesive sticks according to the invention are distinguished by good soft-rubbing characteristics, a uniform film with no unevenness being obtained with little effort.

The compressive strengths are in the range from about 30 to 70 N/16 mm ∅.

EXAMPLES

In a twin-screw Z header, various starch ethers (solids concentration=70% by weight to 75% by weight) were sheared for 3 hours at approx. 80° C. in a water-based system and subsequently diluted with water to a solids content of 30% by weight. The solution viscosities were determined at room temperature (RT) using a Brookfield viscosimeter:

TABLE 1

Viscosity of various aqueous starch ether solutions (30% by weight) at room temperature

| Starting material | Viscosity [mPas] After shearing | Before shearing |
|---|---|---|
| HES-K 250 | 11,700 | >2,000,000 |
| HES-K 500 | 9,000 | >2,000,000 |
| HES-K 750 | 5,700 | >2,000,000 |
| HES-K 1000 | 5,200 | >2,000,000 |
| HES-K 1250 | 2,700 | >2,000,000 |
| HPS-K 100 | 19,000 | >2,000,000 |
| HPS-K 250 | 12,000 | >2,000,000 |
| HPS-K 500 | 8,000 | >2,000,000 |
| HPS-K 750 | 3,400 | >2,000,000 |
| HPS-K 1000 | 4,500 | >2,000,000 |
| HPS-K 1250 | 3,600 | >2,000,000 |
| HE/HPS-K 250/250 | 10,000 | >2,000,000 |
| HE/HPS-K 500/500 | 11,800 | >2,000,000 |
| HE/HPS-K 1000/1000 | 16,200 | >2,000,000 |
| HBS-K 750 | 4,700 | >2,000,000 |
| HBS-K 1250 | 2,700 | >2,000,000 |
| DHPS-K 500 | 6,700 | >2,000,000 |
| DHPS-K 1000 | 18,000 | >2,000,000 |
| HPS-M 750 | 7,100 | >2,000,000 |
| HPS-t 750 | 7,700 | >2,000,000 |
| CMS-K 240/16 | 75,000 | >2,000,000 |

TABLE 2

Comparison of the viscosity of various aqueous starch ether solutions (10% by weight), sheared and unsheared, at RT

| Starting material | Viscosity [mPas] After shearing | Before shearing |
|---|---|---|
| HES-K 1000 | 200 | 86,000 |
| HPS-K 1000 | 200 | 64,000 |
| HPS-M 750 | 350 | 48,000 |
| HPS-T 750 | 360 | 84,000 |
| DHPS-K 1000 | 730 | 96,000 |

As the examples in Table 1 and Table 2 show, the viscosity of a starch ether solution is several times higher before the treatment than after the treatment.

| Definitions | |
|---|---|
| HPS | hydroxypropyl starch |
| HBS | hydroxybutyl starch |
| DHPS | dihydroxypropyl starch |
| K, M, T | basis potato starch, cornstarch, tapioca starch |
| 100 | molar ratio starch:PO = 1:0.100 |
| 750 | molar ratio starch:PO = 1:0.750 |
| 1000 | molar ratio starch:PO = 1:1.000 |
| HES | hydroxyethyl starch |
| HE/HPS | hydroxyethyl hydroxypropyl starch |
| CMS | carboxymethyl starch |
| 240/16 | molar ratio starch:MCAc = 1:0.240 molar ratio starch:GCH-PGE = 100:0.016 (GCH-PGE = bis-glycerol chlorohydrin polyglycol ether, MW = 780, MCAc = methyl cellulose acetate). |

I. Preparation of the starch ether solutions Examples of destructuring of the starch by mechanical treatment Example 1

Degradation in a Z kneader (see also Tables 1 and 2):
1.8 kg of a starch ether HES-K 1250 (solids concentration =80.4% by weight) were sheared for 3 hours at approx. 80° C. with 440 ml water in a twin-screw Z kneader. After cooling with continued kneading, the starch ether was carefully diluted with water to a solids content of 30% by weight. The viscosity of the resulting solution as measured at room temperature was 3,600 mPas (Brookfield viscosimeter).

Example 2

Degradation in a cross-arm paddle mixer:

40 kg of a starch ether HPS-K 750 (solids concentration =41.5% by weight) were stirred for 5 hours at 60°-65° C. in a reactor equipped with a cross-arm paddle stirrer and flow baffles.

The starch ether was then diluted with water to a solids content of 30% by weight in the reactor. The viscosity of the resulting solution as measured at room temperature was 14,000 mPas (Brookfield viscosimeter).

Example 3

Degradation in a rotor/stator system:

From a storage vessel filled with 6 kg of a starch ether HPS-K 750 (solids concentration=42% by weight), the starch ether was continuously pumped to a high-speed rotor/stator machine at 75° to 80° C. and was then recirculated to the storage vessel. The test was terminated after shearing for about 1 hour at a rate of 120 to 160 kg/h and at a temperature of 75 to 80° C. After dilution to a solids content of 30% by weight, the viscosity of the solution as measured at room temperature was 6,000 mPas (Brookfield viscosimeter).

Example 4

Degradation in an extruder (twin-screw):

1.5 Parts by weight of a starch ether HES-K 1250 (solids concentration=75% by weight) were sheared for three hours at approx. 80° C. with 0.5 part by weight water in a twin-screw extruder. After cooling with continued kneading, the starch ether was carefully diluted with water to a solids content of 30% by weight. The viscosity of resulting solution as measured at room temperature was 4,000 mPas (Brookfield viscosmeter).

Example 5

Degradation by oxidation 41.8 g of a 32.1% hydrogen peroxide solution were added at 60° C. to 17.9 kg of a starch ether HPS-T750 (solids concentration=40.7%). The solution was heated to 83° C. and stirred for 2.5 h using a cross-arm paddle stirrer, the solution becoming more thinly liquid. The viscosity of the resulting solution as measured at 20° C. was 9,000 mPas (Brookfield viscosimeter) for a solids content of 30%.

Example 6

Degradation by acid hydrolysis

In a 1000 ml stirred glass flask, 432 g of a starch ether solution HPS-T750 (solids concentration=40.7%) were diluted with 28 g water and acidified with 126 ml 2-molar HCl to, a pH value of 1.2. The solution was then heated for 40 minutes at 65° C.

The viscosity of the resulting solution as measured at room temperature was 5,700 mPas (Brookfield viscosimeter).

Example 7

Degradation by enzymatic action In a 1000 ml stirred glass flask, 508 g of a starch ether solution HPS-T750 (solids concentration=40.7%) were diluted with 41 g water and 121 ml 2-molar HCl and, after heating to 65° C., were adjusted with 2-molar HCl solution to a pH value of 6. 6.6 mg alpha-amylase (BAN 800 MG, KNU/g) were added to the resulting solution, followed by stirring for 30 minutes at 65° C. The solution was then refluxed for 20 minutes to inactivate the enzyme. The viscosity of the resulting solution as measured at room temperature was 5,400 mPas (Brookfield viscosimeter).

II. Examples of starch ether sticks

A Viscosity-reduced starch ethers (invention)
B Non-viscosity-reduced starch ethers (comparison)

The starch ethers contain free alkali which is generally sufficient to saponify the fatty acids.

In the following Examples, therefore, sodiumhydroxide is only mentioned when it is additionally necessary for complete saponification. The sticks were produced as described in the Examples.

Examples of starch ether sticks

Example 1A

| | |
|---|---|
| 22.5 g | HPS-K 750, mechanically destructured |
| 4.2 g | monocarboxylic acid, C16 |
| 1.3 g | monocarboxylic acid, C18 |
| 1.0 g | monocarboxylic acid, C14 |
| 6.5 g | sorbitol solution |
| 10.0 g | glycerol |
| 54.5 g | water |

Rubbing: pliant Open time: 50 seconds Setting time: 3.5 minutes Compressive strength: 45 N/16 mm ∅

Example 2A

| | |
|---|---|
| 23.2 g | HPS-T 750 degraded by oxidation |
| 5.5 g | monocarboxylic acids, C16/C18 |
| 9.5 g | sorbitol solution |
| 7.0 g | glycerol |
| 3.0 g | 1,2-propylene glycol |
| 51.8 g | water |

Rubbing: pliant Open time: 60 seconds Setting time: 3-4 minutes Compressive strength: 48 N/16 mm ∅

Example 3A

| | |
|---|---|
| 24.5 g | HE/HPS-K 1000 mechanically destructured |
| 6.0 g | monocarboxylic acids, C16/C18 |
| 10.0 g | sorbitol solution |
| 10.0 g | glycerol |
| 0.2 g | sodium hydroxide |
| 49.3 g | water |

Rubbing: smooth, pliant Open time: 50-60 seconds Setting time: 3.5 minutes Compressive strength: 46-48 N/16 mm ∅

Example 4A

| | |
|---|---|
| 23.7 g | HE/HPS-K 1000 mechanically destructured |
| 5.5 g | monocarboxylic acids, C16/C18 |
| 6.5 g | sorbitol solution |
| 8.0 g | glycerol |
| 56.3 g | water |

Rubbing: pliant Open time: 50-60 seconds Setting time: 3 minutes Compressive strength: 43-44 N/16 mm ∅

Example 5A

| | |
|---|---|
| 24.3 g | HPS-M 750, mechanically destructured |
| 5.5 g | monocarboxylic acids, C16/C18 |

-continued

```
2.0 g  sodium hydroxide
10.0 g sorbitol solution
9.0 g  glycerol
49.2 g water
```

Rubbing: pliant Open time: 50 seconds Setting time: 3–4 minutes Compressive strength: 48–50 N/16 mm ⌀

Example 6A

```
24.3 g HBS-K 750, mechanically destructured
5.5 g  monocarboxylic acids, C16/C18
8.0 g  sorbitol solution
9.0 g  glycerol
4.0 g  1,2-propylene glycol
1.0 g  sodium hydroxide
48.2 g water
```

Rubbing: pliant Open time: 45–60 seconds Setting time: 2.5–3 minutes Compressive strength: 45 N/16 mm ⌀

Example 7A

```
24.5 g DHPS-K 1000, mechanically destructured
5.5 g  monocarboxylic acid C16/C18
9.0 g  sorbitol solution
8.0 g  glycerol
1.0 g  sodium hydroxide
52.0 g water
```

Rubbing: pliant Open time: 50–60 seconds Setting time: 2.5–3 minutes Compressive strength: 44 N/16 mm ⌀

Example 8A

```
5.5 g  monocarboxylic acid, C16/C18
20.0 g HPS-M750, mechanically destructured
4.3 g  PVP K80
2.0 g  NaOH
10.0 g sorbitol solution
8.0 g  glycerol
2.0 g  caprolactam
48.2 g H2O
```

Rubbing: pliant Open time: 50–60 seconds Setting time: 2.5–3 minutes Compressive strength: 50 N/16 mm ⌀

Example 9A

```
5.5 g  monocarboxylic acid, C16/C18
15.0 g HPS-M750, mechanically destructured
7.0 g  HPS-T750, degraded by acid hydrolysis
3.3 g  PVP K80
10.0 g sorbitol solution
8.0 g  glycerol
1.0 g  caprolactam
48.2 g H2O
```

Rubbing: pliant Open time: 50–60 seconds Setting time: 2–3 minutes Compressive strength: 43 N/16 mm ⌀

Example 10A

```
5.5 g  monocarboxylic acids, C16/C18
15.0 g HPS-T750, degraded by oxidation
7.0 g  HPS T750, enzyme-degraded
3.0 g  PVP K90
10.0 g sorbitol solution
7.0 g  glycerol
3.0 g  caprolactam
47.5 g H2O
```

Rubbing: pliant Open time: 45–50 seconds Setting time: 1.5–2.5 minutes Compressive strength: 41 N/16 mm ⌀

PVP K80 and PVP K90 are polyvinyl pyrrolidones of BASF.

The sorbitol solution is a 70% aqueous solution.

Examples of starch ether sticks B

Example 1B

```
21.5 g HPS-K 750
6.6 g  monocarboxylic acids, C16/C18
8.0 g  sorbitol solution
7.0 g  glycerol
5.0 g  1,2-propylene glycol
51.9 g water
```

Example 2B

```
21.5 g HPS-T 750
6.5 g  monocarboxylic acids, C16/C18
8.0 g  sorbitol solution
7.0 g  glycerol
5.0 g  1,2-propylene glycol
51.9 g water
```

Example 3B

```
23.8 g HPS-K 750
6.6 g  monocarboxylic acids, C16/C18
7.5 g  sorbitol solution
6.0 g  glycerol
6.0 g  1,2-propylene glycol
1.5 g  polyethylene glycol
48.6 g water
```

In all three Comparison Examples with starch ethers having a viscosity of at least 2,000,000 mPas, the adhesive sticks obtained were unsuitable for practical use:

Rubbing was greasy and stringy.

The constitution was friable so that the adhesive film obtained was so lacking in uniformity that the uneven areas could still be seen after the bonding of paper.

Tackiness was so poor that paper could not be firmly bonded.

In addition, it was difficult to produce adhesive sticks:

The filling was uneven and contained air bubbles.
Anchorage at the base of the stick was inadequate.
The adhesive formed threads during filling.

Tests for the quality control of adhesive sticks
Compressive strength

Compressive strength is understood to be the maximum load measured parallel to the longitudinal axis on collapse of the stick under pressure.

Compressive strength is measured with an Erichsen Model 464L compressive strength tester, measuring head 709 (manufacturer: Erichsen, Simonshöfchen 31, 56 Wuppertal 11). The adhesive cut off with a minimum length of 30 mm immediately above the piston is placed between two holders in the form of approx. 10 mm thick disks of rigid PVC which are formed with a circular 3 mm deep depression adapted to the particular stick diameters. The stick provided with the holders is placed centrally on the table of the compressive strength tester. The height of the force measuring instrument over the table is adapted to the height of the stick to be tested. The measuring head is then advanced against the stick to be tested at a rate of approx. 70 mm per minutes. On reaching the maximum compressive force, the value is read off from the digital display.

Setting time

To determine whether the adhesive properties of the sticks; are sufficient for the application envisaged, bonding tests are carried out by hand under certain processing conditions and evaluated. The following procedure is adopted:

A supply of white chrome paper (weight per unit area approx. 100 g/m$^2$) coated on one side and adhesive sticks to be tested are conditioned for at least 24 hours at 20° C./65% relative air humidity. The test paper is cut into strips 5 cm side and approx. 30 cm long. An adhesive stick is rubbed twice longitudinally under uniform pressure over the uncoated side of a paper strip and should produce a uniform film. Immediately afterwards, a second paper strip which has not been coated with adhesive is placed on the coated strip with its uncoated side facing inwards and rubbed on by hand. An attempt is then made to peel the paper strips slowly from one another. The time at which separation in the adhesion zone is only possible with tearing of paper over entire width characterizes the setting time.

Open time

The open time is the time after application of the adhesive within which the materials to be bonded have to be fitted together in order, after setting, to obtain complete tearing of paper in the separation test. The method is the same as that used to determine setting time except that the strips of paper are only fitted together after defined times following application of the adhesive. Beginning with 15 seconds, the open time may be graduated, for example, in intervals of 15 seconds. With slow-setting adhesives having predictably longer open times, correspondingly longer intervals will be selected.

Rubbing

Rubbing is subjectively evaluated by at least two examiners. The performance properties are characterized and classified as follows: smooth, pliable, flat, crumbly, greasy, hard, soft and stringy.

We claim:

1. An article useful as an adhesive stick comprising a water-based preparation of a macromolecular substance as an adhesive component and a soap gel as a shaping gel-forming component, wherein a viscosity-reduced starch ether with a viscosity of 100 to 1,000,000 mPas., Brookfield at 20° C, as measured in a 30% by weight solids aqueous solution and a degree of substitution of from 0.1 to 2.0 is present in the adhesive component.

2. An adhesive stick as claimed in claim 1 wherein said starch ether is nonionic and are reaction products of a native starch with a member selected from the group of ethylene oxide, propylene oxide, butylene oxide and glycidol.

3. An adhesive stick as claimed in claim 1 wherein the degree of substitution is from 0.2 to 1.0.

4. An article as claimed in claim 1 wherein said viscosity is reduced by mechanical destructuring, chemical destructuring, or by a combination of mechanical and chemical destructuring.

5. An article as claimed in claim 1 wherein said starch ether has a viscosity of 2,000 to 100,000 mPas.

6. An article as claimed in claim 1 wherein said starch ether has a viscosity of 3,000 to 30,000 mPas.

7. An article as claimed in claim 1 containing 5 to 10% by weight starch ethers having a viscosity of 1,000,000 to 50,000 mPAs.

8. An article as claimed in claim 1 containing 10 to 30% by weight starch ether having a viscosity of 100,000 to 2,000 mPAs.

9. An article as claimed in claim 1 containing 30 to 50% by weight starch ether having a viscosity of 30,000 to 100 mPAs.

10. An article as claimed in claim 1 wherein the content of said viscosity-reduced starch ether is 5% by weight based on the total weight of the stick.

11. An article as claimed in claim 1 wherein the content of said viscosity-reduced starch ether is greater than 10% by weight based on the total weight of the stick.

12. An article as claimed in claim 1 wherein the content of said viscosity-reduced starch ether is greater than 15% by weight and at most 50% by weight based on the total weight of the stick.

13. An article as claimed in claim 1 wherein a sodium salt of a $C_{12}$–$C_{22}$ fatty acid of natural or synthetic origin is present as the soap forming the gel structure.

14. An article as claimed in claim 13 wherein said fatty acids is a $C_{14}$–$C_{18}$ fatty acid.

15. An article as claimed in claim 13 wherein the sodium salt of the fatty acid is present in a quantity of 3 to 20% by weight based on the total weight of the stick.

16. An article as claimed in claim 16 wherein the sodium salt of the fatty acid is present in a quantity of 5 to 10% by weight.

17. An article as claimed in claim 11 further containing at least one member selected from the group consisting of plasticizers, pigments, dyes, fragrances, preservatives, moisture regulators, and other water-soluble and/or water-dispersible polymers present as a further auxiliary.

18. An article as claimed in claim 1 wherein said article contains
 3 to 10% by weight sodium soap as said gel-forming component,
 5 to 40% by weight viscosity-reduced starch ether,
 0 to 25% by weight auxiliaries,
 0 to 20% by weight water-soluble or dispersible polymer balance to 100% by weight water.

19. An article as claimed in claim 1 wherein said article has a compressive strength of 30 to 70 N/16 mm Ø.

20. In a method of surface-to-surface bonding of substrates, the improvement comprising rubbing an article as claimed in claim 1 over the surface of one of said substrates.

21. A method as claimed in claim 20 wherein one of said substrates is paper and/or cardboard.

22. A process for the production of an article useful as an adhesive stick comprising: preparing an aqueous system of a viscosity-reduced starch ether having a degree of substitution of from 0.1 to 2.0 with degradation of the starch superstructures by mechanical action or by chemical degradation to a viscosity of from 100 to 1,000.000, mPAs, Brookfield at 20° C., measured in a 30% by weight aqueous solution, then thoroughly mixing the resulting preparation with a soap component which forms a soap gel, heating the mixture to temperatures of at least 50° C. until a uniform mixture is obtained, and cooling the mixture in the absence of mechanical action to form a gel.

23. A process as claimed in claim 22 wherein said aqueous system contains from 20% to 70% by weight of said viscosity-reduced starch ether.

24. A process as claimed in claim 22 wherein said aqueous system is diluted with ,water after said degradation to a content of viscosity-reduced starch ether of 20 to 40% by weight.

* * * * *